(12) United States Patent
Okazaki

(10) Patent No.: US 10,041,617 B2
(45) Date of Patent: Aug. 7, 2018

(54) HOSE CONNECTOR AND AUTOMOTIVE COMPONENT PART INCORPORATED WITH HOSE CONNECTOR

(71) Applicant: NIFCO INC., Yokosuka-shi, Kanagawa (JP)

(72) Inventor: Tsuyoshi Okazaki, Yokosuka (JP)

(73) Assignee: NIFCO INC., Kanagawa (JP)

( * ) Notice: Subject to any disclaimer, the term of this patent is extended or adjusted under 35 U.S.C. 154(b) by 213 days.

(21) Appl. No.: 15/128,508

(22) PCT Filed: Mar. 3, 2015

(86) PCT No.: PCT/JP2015/001127
§ 371 (c)(1),
(2) Date: Sep. 23, 2016

(87) PCT Pub. No.: WO2015/145999
PCT Pub. Date: Oct. 1, 2015

(65) Prior Publication Data
US 2017/0248260 A1 Aug. 31, 2017

(30) Foreign Application Priority Data
Mar. 28, 2014 (JP) ................................ 2014-069172

(51) Int. Cl.
*F16L 33/22* (2006.01)
(52) U.S. Cl.
CPC ......... *F16L 33/225* (2013.01); *F16L 2201/10* (2013.01); *F16L 2201/20* (2013.01)
(58) Field of Classification Search
CPC ..... F16L 33/223; F16L 33/225; F16L 37/107; F16L 37/248; F16L 37/252
(Continued)

(56) References Cited

U.S. PATENT DOCUMENTS 5,145,213 A * 9/1992 Marrison ................ F16L 35/00
285/3
7,100,948 B2 * 9/2006 Guest ................... F16L 37/0925
285/376

FOREIGN PATENT DOCUMENTS

GB 431918 7/1935
JP 62194993 U1 12/1987
(Continued)

OTHER PUBLICATIONS

International Search Report of International Application No. PCT/JP2015/001127, dated May 26, 2015, 5 pages.

*Primary Examiner* — David Bochna
(74) *Attorney, Agent, or Firm* — Armstrong Teasdale LLP

(57) ABSTRACT

Provided is a hose connector that is protected from inadvertent disconnection, and permits any problem with the hose connection to be readily detected. The hose connector (10) includes a connector main body (12), and a lock member (14) fitted on the connector main body. When the lock member (14) is displaced to a locked position, an annular reduced diameter portion (42) of the lock member (14) approaches an annular enlarged diameter portion (24) of the connector main body (12) so that these two portions clamp the wall of the hose. The lock member (12) is held in the locked position by a second engagement portion (38) formed in the inner circumferential surface of the lock member (12) engaging the connector main body (12). When the lock member (14) placed in the locked position is subjected to a twisting force exceeding a prescribed value, a frangible part (49) provided between the second engagement portion (38) and the annular reduced diameter portion (42) fractures, but the connection of the hose is maintained because the second engagement portion supports the annular reduced diameter portion from the rear via the frangible part (49).

8 Claims, 12 Drawing Sheets

(58) Field of Classification Search
USPC .......................................... 285/3, 402, 376
See application file for complete search history.

(56) References Cited

FOREIGN PATENT DOCUMENTS

| | | |
|---|---|---|
| JP | H1122884 A | 1/1999 |
| JP | 2961532 B1 | 10/1999 |
| JP | 2000170972 A | 6/2000 |
| JP | 2006300127 A | 11/2006 |
| JP | 2010265916 A | 11/2010 |
| JP | 2015083851 A | 4/2015 |

* cited by examiner

HOSE CONNECTOR AND AUTOMOTIVE COMPONENT PART INCORPORATED WITH HOSE CONNECTOR

TECHNICAL FIELD

The present invention relates to a hose connector for connecting a hose thereto. In particular, the present invention relates to a hose connector for connecting a hose for transporting fluid such washer fluid to be sprayed onto a windshield or a head lamp of a motor vehicle to a washer fluid tank, a washer fluid nozzle or another hose, or for connecting a hose for transporting blow-by gas of a motor vehicle.

BACKGROUND OF THE INVENTION

A hose connector is required to be capable of being fixedly secured to a hose and prevent the leakage of fluid that is conducted by the hose. For instance, an annular metallic band is often used when a rubber hose is to connected to an end of a pipe. In such a case, the metallic band is fitted onto an end of the hose so that the inner circumferential surface of the metallic band is loosely in contact with the outer circumferential surface of the hose, and the opposing end of the pipe is inserted into the hose such that the inner circumferential surface of the hose is brought into contact with the outer circumferential surface of the pipe. The metallic band is then slid along the length of the hose to a position where the hose and the pipe overlap with each other, and the metallic band is tightened by using a suitable tool until the hose is clamped between the metallic band and the pipe. Thereby, the hose and the pipe are connected to each other in a fluid tight manner. However, this process requires some effort on the part of the user, and a suitable tool is required. Furthermore, it is necessary to test the state of the connection achieved by the metallic band.

Patent Document 1 discloses a fastening structure (fitting) for connecting a hose to a pipe in a more simple manner. This fastening structure uses a fastening sleeve instead of a metallic band, and an engagement arrangement is provided for the purpose of engaging the pipe with the fastening sleeve. This fastening arrangement includes an engagement projection provided on the pipe and an engagement groove provided on the fastening sleeve so that the engagement groove causes the fastening sleeve to move in the axial direction of the pipe by turning the fastening sleeve. The end part of the pipe is formed with an annular projection bulging out in the radial direction, and the rear end of the fastening sleeve is formed with a pressure portion which tapers toward the rear end thereof. After the fastening sleeve is fitted on the end part of the hose, the hose is fitted on the pipe, the fastening sleeve is slid toward the pipe, and the fastening sleeve is turned so that the fastening sleeve is displaced in the axial direction, and the pressure portion is brought closer to the annular projection. The hose is thereby clamped between the pressure portion and the annular projection in a secure and fluid tight manner.

PRIOR ART DOCUMENT(S)

Patent Document(s)

Patent Document 1: JP2006-300127A

SUMMARY OF THE INVENTION

Task to be Accomplished by the Invention

The connecting arrangement disclosed in Patent Document 1 allows the hose which is already connected to the pipe to be disconnected once again by turning the fastening sleeve in the reverse direction. Therefore, if the fastening sleeve should be inadvertently turned in the reverse direction, the hose could be disconnected, and it may not be detected by the user.

The present invention was made in view of such problems of the prior art, and has a primary object to provide a hose connector that is protected from inadvertent disconnection, and permits any problem with the hose connection to be readily detected.

Means to Accomplish the Task

The present invention provides a hose connector (10, 100) for connecting a hose, comprising; a connector main body (12, 102) including an inner tubular portion (18) and a first engagement portion (20) formed on an outer circumference of a base end part of the inner tubular portion; and a lock member (14) including an outer tubular portion (34) fitted on the inner tubular portion and having an inner circumferential surface defining an annular gap (80) in cooperation with an outer circumferential surface of the inner tubular portion, and a second engagement portion (38) formed on the outer tubular portion for selective engagement with the first engagement portion; wherein the lock member is rotatable relative to the connector main body around an axial line in a prescribed direction so as to displace the lock member from an unlocked position to a locked position in an axial direction, an engagement structure (64, 72) formed jointly by the first engagement portion and the second engagement portion engaging the two engagement portions to each other in the locked position so as to prevent the rotation of the lock member back to the unlocked position; wherein the inner tubular portion is provided with an annular enlarged diameter portion (42) on an outer circumferential surface thereof, and the outer tubular portion is provided with an annular reduced diameter portion (24) on an inner circumferential surface thereof, the annular enlarged diameter portion and the annular reduced diameter portion being positioned such that the annular enlarged diameter portion and the annular reduced diameter portion are axially spaced from each other when the lock member is in the unlocked position, and axially proximate to each other when the lock member is in the locked position; wherein a front end of a hose can be inserted in the annular gap between the inner tubular portion and the outer tubular portion when the lock member is in the unlocked position, and the front end of the hose can be clamped between the annular enlarged diameter portion and the annular reduced diameter portion when the lock member is displaced to the locked position; and wherein the lock member is provided with a frangible part (49, 86) that is preferentially fractured before the engagement structure between the first engagement portion and the second engagement portion is broken, or the annular enlarged diameter portion or the annular reduced diameter portion is fractured when a twisting force exceeding a prescribed level is applied to the lock member in the locked position, the frangible part being positioned so as to prevent or restrain the annular enlarged diameter portion and the annular reduced diameter portion from separating from each other when fractured.

According to this arrangement, the hose can be secured simply by displacing the lock member to the locked position. Once the lock member is displaced to the locked position, the engagement structure formed by the first engagement portion and the second engagement portion prevents the relative rotation between the two portions so that the lock member cannot be returned to the unlocked position. Therefore, there is very little chance of inadvertent disconnection of the hose. When the lock member is forcibly turned in the reverse direction, the frangible part fractures while the first engagement portion and the second engagement portion are kept in the mutually engaged condition in the locked position. Because the lock member is destroyed in the frangible part when an excessive twisting force is applied to the lock member in the locked position, the user is enabled to detect the fracture of the lock member either visually or tactually, and the clamping force for securing the hose in a sealed condition remains to a certain extent even after the frangible part has fractured.

According to a certain aspect of the present invention, in the foregoing arrangement, the frangible part is formed in a part of the lock member that axially separates the annular reduced diameter portion and the second engagement portion from each other.

Thereby, the user is enabled to visually detect any fracture in the lock member. Because the annular reduced diameter portion is supported against movement away from the annular increased diameter portion by the second engagement portion via the frangible part, the annular reduced diameter portion is prevented or restrained from moving away from the annular enlarged diameter portion so that the hose may be kept fixed to the connector main body in a sealed condition even after the fracture.

According to another aspect of the present invention, in the foregoing arrangements, the lock member is provided with an operation piece (36) projecting outward from an outer circumferential surface of the outer tubular portion, and the frangible part is provided axially between the operation piece and the second engagement portion.

The user typically pinches the operation piece when turning the lock member so that any excessive twisting force that may be applied to the lock member causes a shear stress to be created in the frangible part located between the operation piece and the second engagement piece, and this causes the frangible part to be fractured in a reliable manner.

According to yet another aspect of the present invention, in the foregoing arrangements, the connector main body and the lock member are provided with a cam mechanism for displacing the lock member from the unlocked position to the locked position when the lock member is turned relative to the connector main body in the prescribed direction around the axial line, the cam mechanism including a cam groove (68) formed in one of the connector main body and the lock member and extending obliquely in a circumferential and axial direction, and a follower projection (70) formed in the other of the connector main body and the lock member and received in the cam groove.

In this arrangement, a hose can be connected to the hose connector without requiring a tool. As the necessary work involves only the insertion of the hose into the hose connector and the turning of the lock member, the connection of the hose to the hose connector is extremely simple and prompt.

According to yet another aspect of the present invention, in the foregoing arrangements, the lock member is provided with a curved portion (81) that bulges outward and extends axially so as to space apart the outer circumferential surface of the connector main body and the inner circumferential surface of the lock member at least on one side of an end portion of the lock member.

In this arrangement, the lock member may be cut and removed without damaging the hose or the connector main body by inserting a tool for cutting the lock member into a gap afforded by the curved portion. Therefore, the hose and the connector main body can be used once again.

The present invention also provides an automotive component part (104) integrally provided with the hose connector as discussed above, and defining a fluid passage communicating with the connector main body.

Because the connector main body is integrally formed with the automotive component part to which a hose is to be connected, the efficiency of connecting a hose to the automotive component part is improved.

Effect of the Invention

The present invention thus provides a hose connector that can prevent improper connection of a hose, and allows any improper connection of a hose to be readily detected.

DETAILED DESCRIPTION OF THE PREFERRED EMBODIMENT(S)

Figure 1:
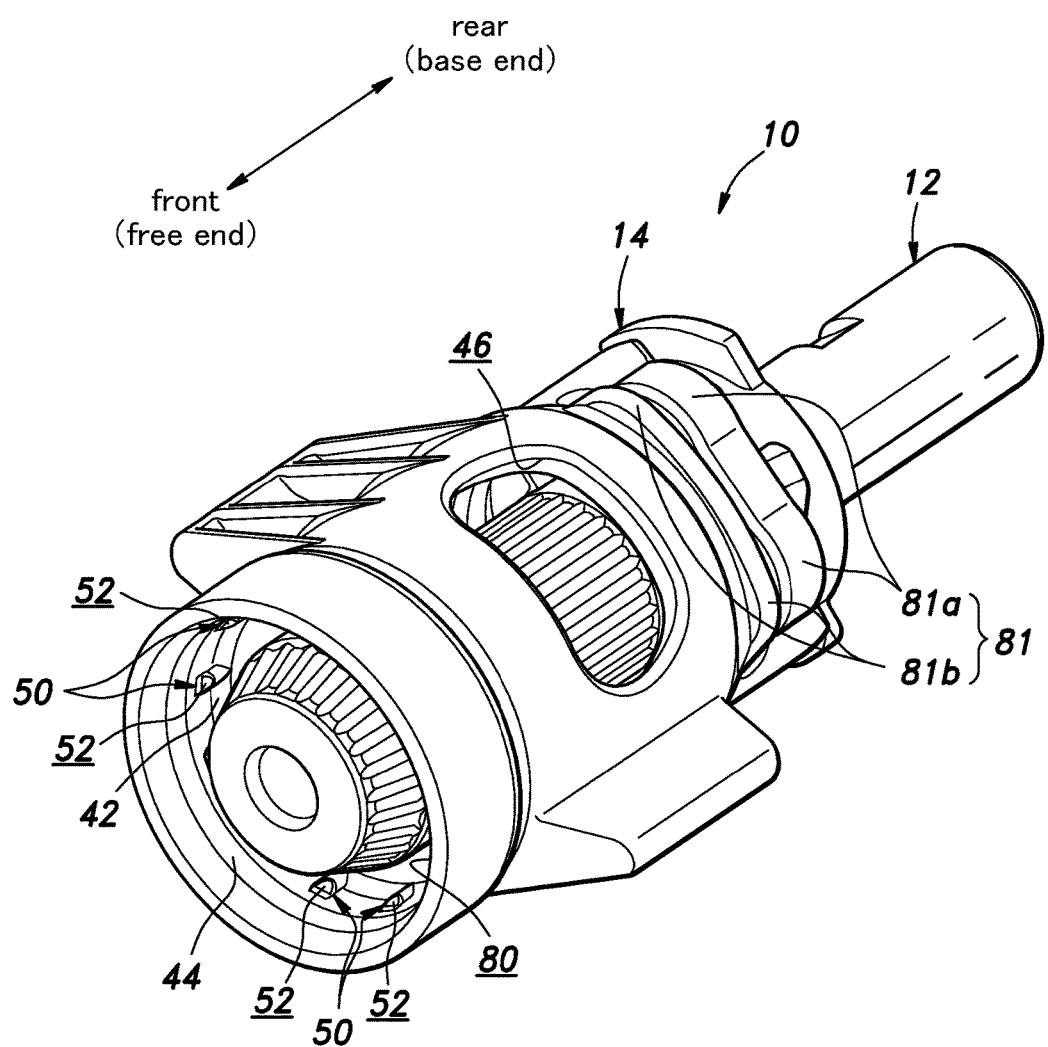
FIG. 1 is a perspective view of a hose connector given as a first embodiment of the present invention.

A hose connector embodying the present invention is described in the following with reference to the appended drawings. In conjunction with the following description, the essential directions are indicated in the drawings, and the fore and aft direction may be referred to as the axial direction.

FIG. 1 is a perspective view of a hose connector 10 embodying the present invention. The hose connector 10 comprises a connector main body 12 having a base end (rear end) connected to another member (not shown in the drawing) and a free end (front end) configured to be connected to a hose, and a lock member 14 for securing the hose to the connector main body 12 in a fluid tight manner. The hose to be connected to the hose connector 10 is made of such material as rubber, plastic, fabric and a combination thereof, and is provided with flexibility and/or resiliency. For instance, the hose may consist of a headlamp washer fluid hose for transporting washer fluid to a headlamp, a cooling pipe, a canister purge hose, a blow-by gas hose, a water hose and so forth.

Figure 2:
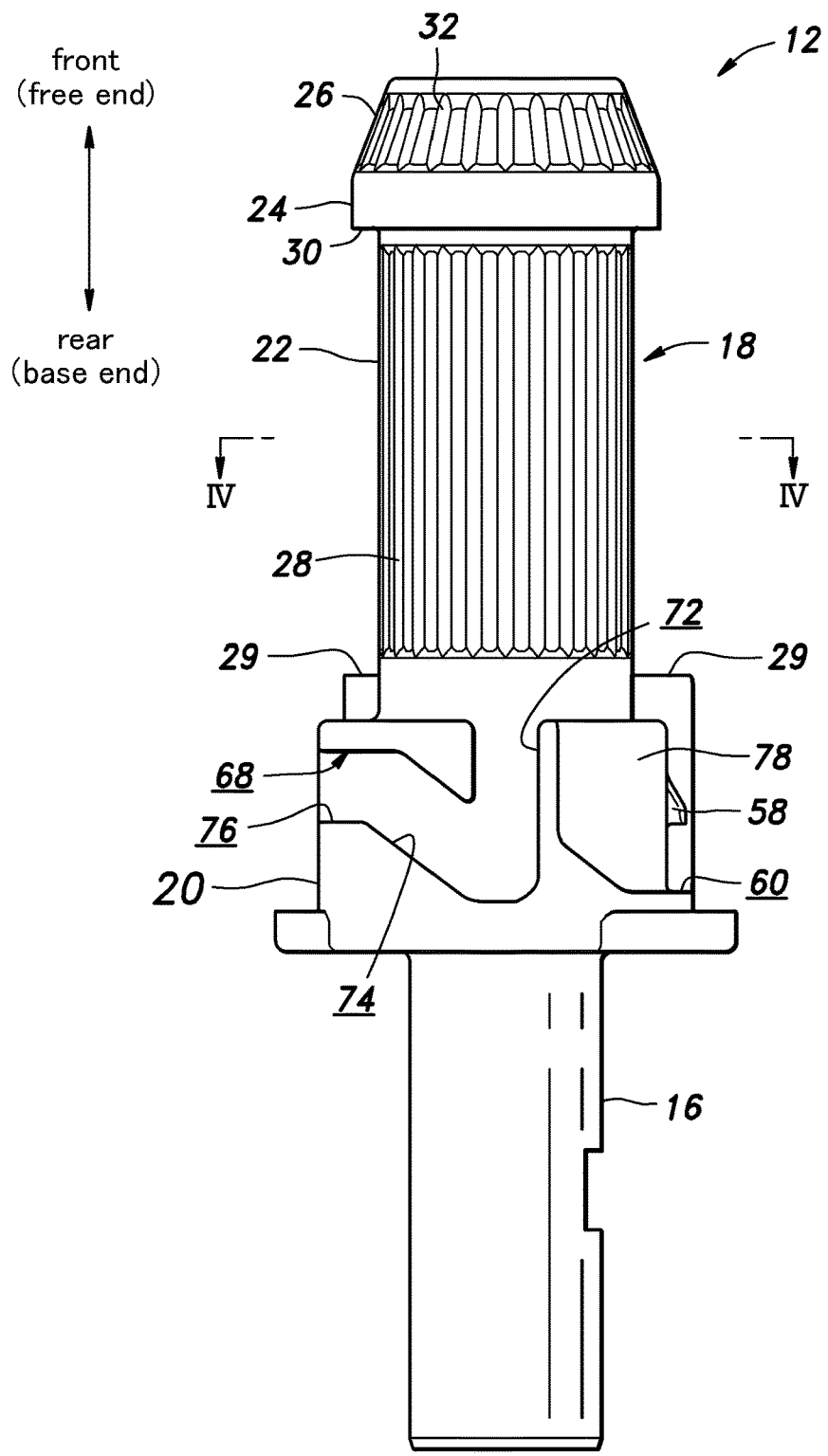
FIG. 2 is a front view of a connector main body of the hose connector.
Figure 3:
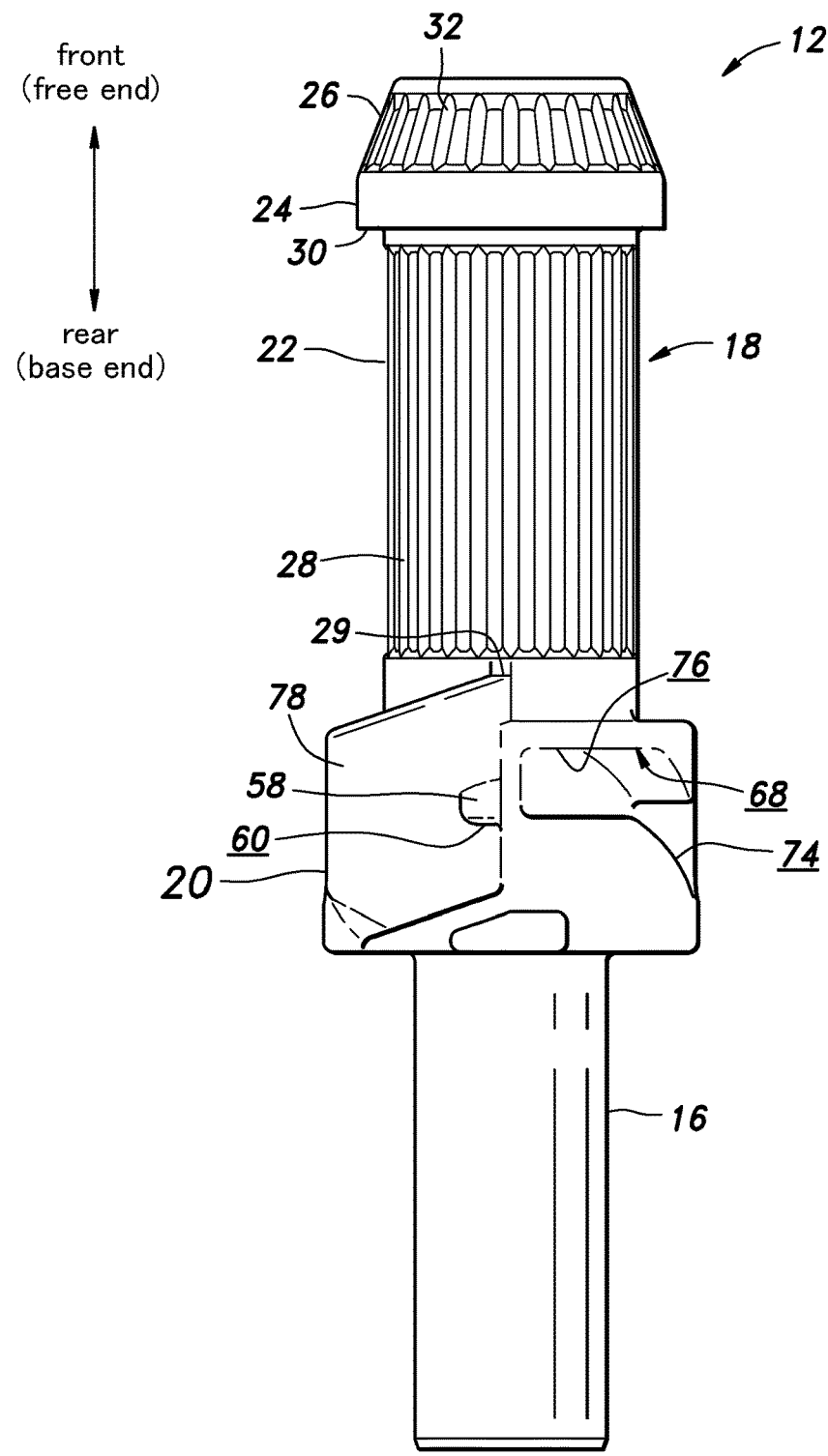
FIG. 3 is a left side view of the connector main body of the hose connector.
Figure 4:
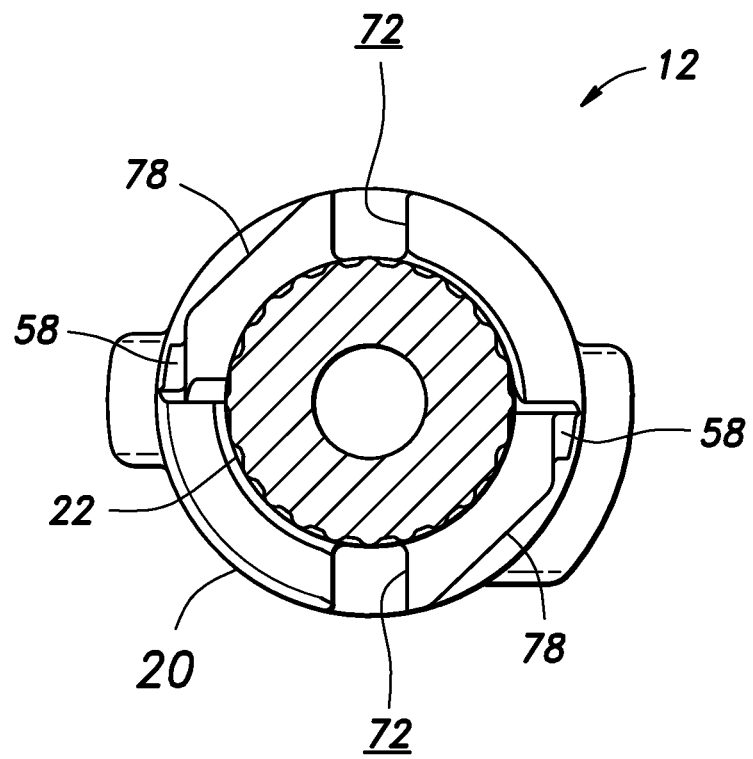
FIG. 4 is a sectional view taken along line IV-IV of FIG. 2.

The connector main body 12 is described in the following with reference to FIGS. 2 to 4 which are a front view, a left side view and a cross sectional view of the connector main body 12, respectively. The connector main body 12 consists of a molded member made of plastic such as glass fiber reinforced plastic or metallic material, and is generally tubular in shape, defining an axial bore for conducting fluid. The connector main body 12 comprises a connecting portion 16 formed in the rear end thereof to be connected to the other member and an inner tubular portion 18 formed in the front end thereof to be connected to a hose.

The connecting portion 16 is typically connected to another member defining a fluid passage such as a pipe, a fluid container and a fluid dispensing device so that the flow passage defined by the hose connector 10 communicates with the flow passage of the other member in a fluid tight manner.

The inner tubular portion 18 comprises a first engagement portion 20, an intermediate portion 22, an annular enlarged diameter portion 24 and an externally tapered end portion 26, in that order from the base end thereof.

The first engagement portion 20 provides a means for engagement between the connector main body 12 and the lock member 14, and has an outer circumferential surface having grooves or other irregularities. These grooves or irregularities are defined by forming grooves or recesses into a cylindrical outer surface having a diameter larger than the outer diameter of the hose. Further details of the first engagement portion 20 will be described hereinafter.

The intermediate portion 22 consists of a cylindrical part having a substantially constant outer diameter, and is formed with a plurality of ribs 28 extending in the fore and aft direction on the outer circumferential surface thereof. The tips of the ribs 28 define a circle having an outer diameter substantially equal to the inner diameter of the hose. Because the outer diameter of the intermediate portion 22 is smaller than the outer diameter of the free end side of the first engagement portion 20, the free end side of the first engagement portion 20 defines an annular shoulder surface 29 facing the free end side.

The annular enlarged diameter portion 24 consists of a tubular part having a constant outer diameter which is larger than the outer diameter of the intermediate portion 22. The base end side of the annular enlarged diameter portion 24 defines an annular shoulder surface 30 facing the base end side. The outer circumferential surface of the annular enlarged diameter portion 24 is smoothly finished without any ribs. The outer diameter of the annular enlarged diameter portion 24 is greater than the inner diameter of the hose in an unstressed state. However, the hose is able to resiliently deform to such an extent that the inner diameter of the hose can be made equal to or greater than the outer diameter of the annular enlarged diameter portion 24.

The outer circumferential surface of the externally tapered end portion 26 is formed with a plurality ribs 32 extending between the base end side and the free end side thereof. The outer diameter of the base end side of the externally tapered end portion 26 (the diameter of the circle defined by connecting the peaks of the ribs) coincides with the outer diameter of the annular enlarged diameter portion 24, and the externally tapered end portion 26 is tapered toward the free end side thereof so that the outer diameter of the free end thereof is smaller than the inner diameter of the hose.

Figure 5:
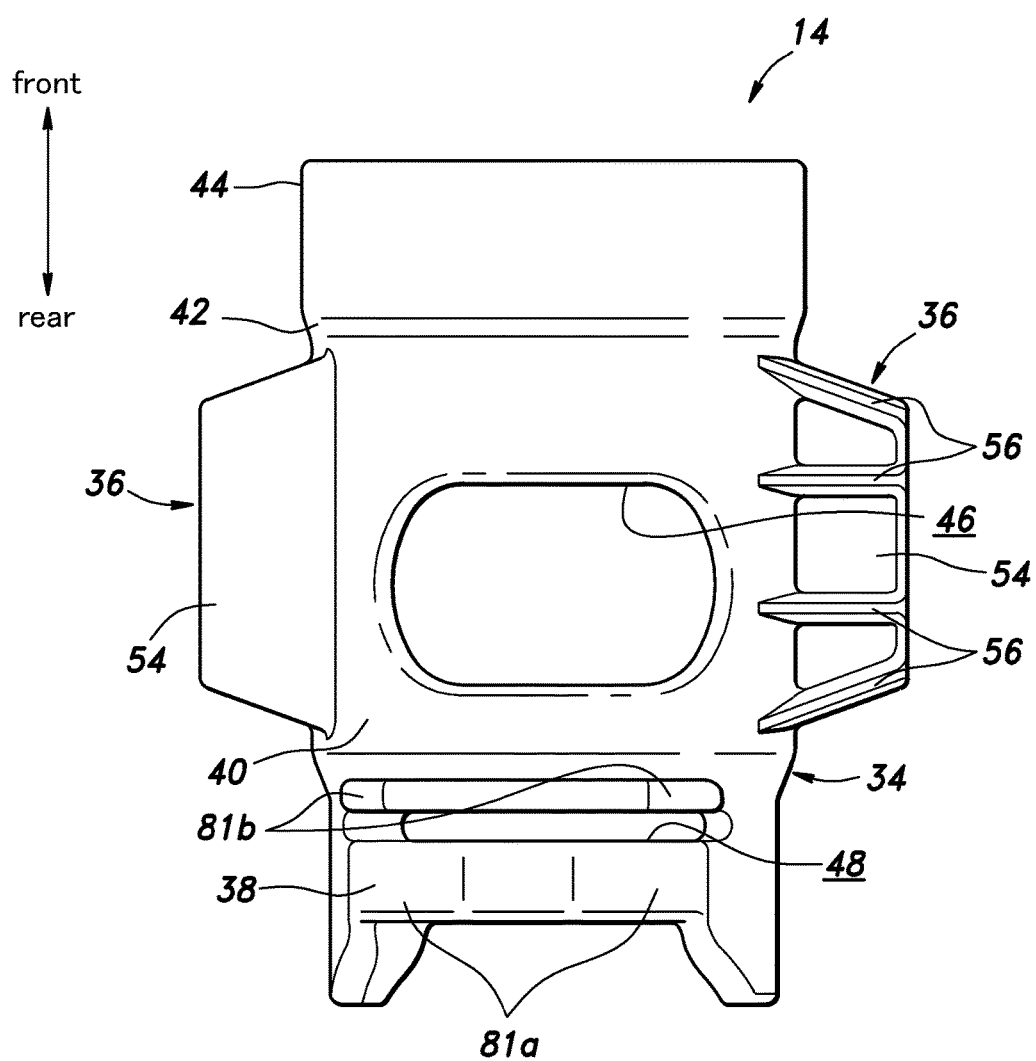
FIG. 5 is a front view of a lock member of the hose connector.
Figure 6:
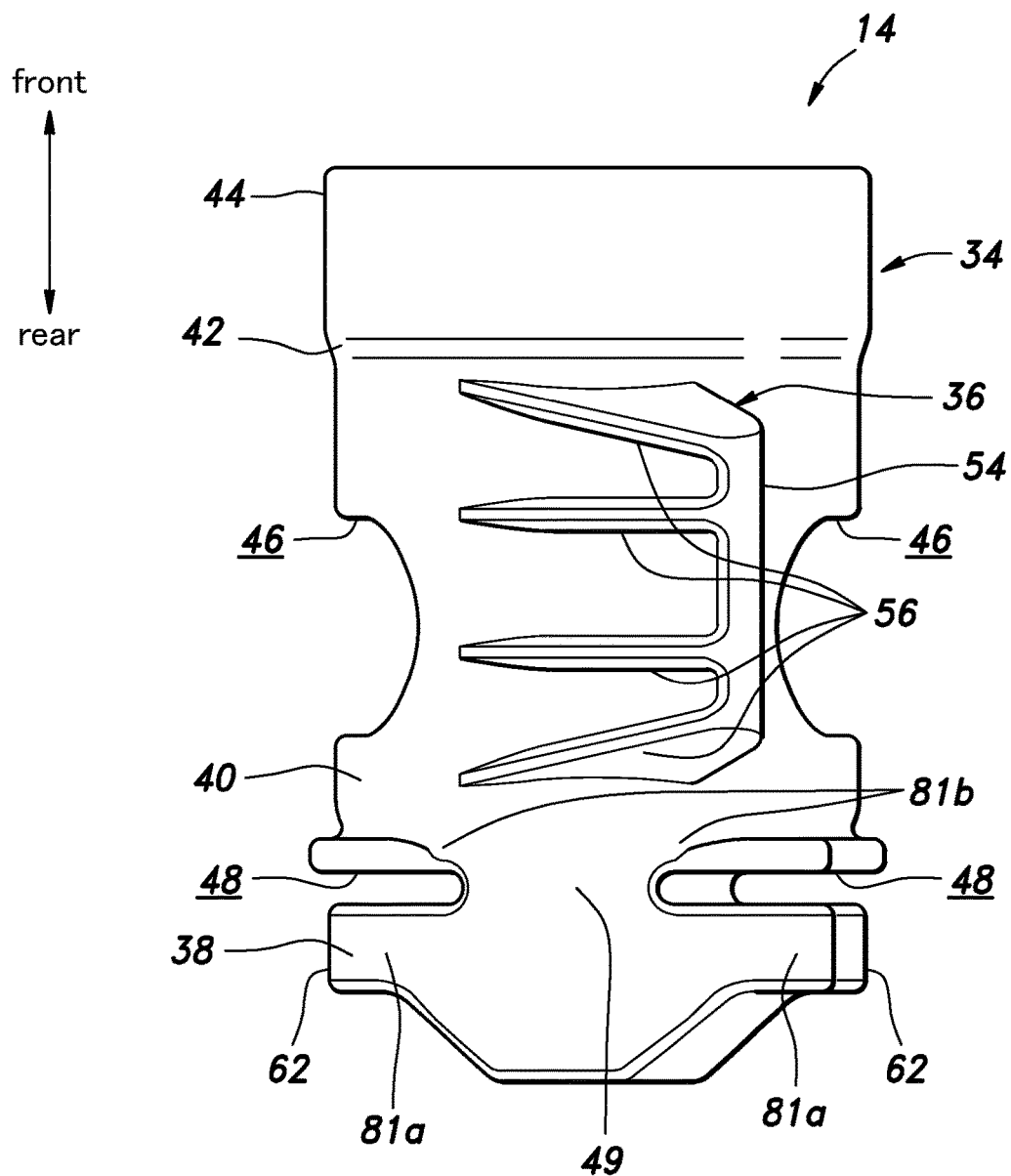
FIG. 6 is a right side view of the lock member of the hose connector.
Figure 7:
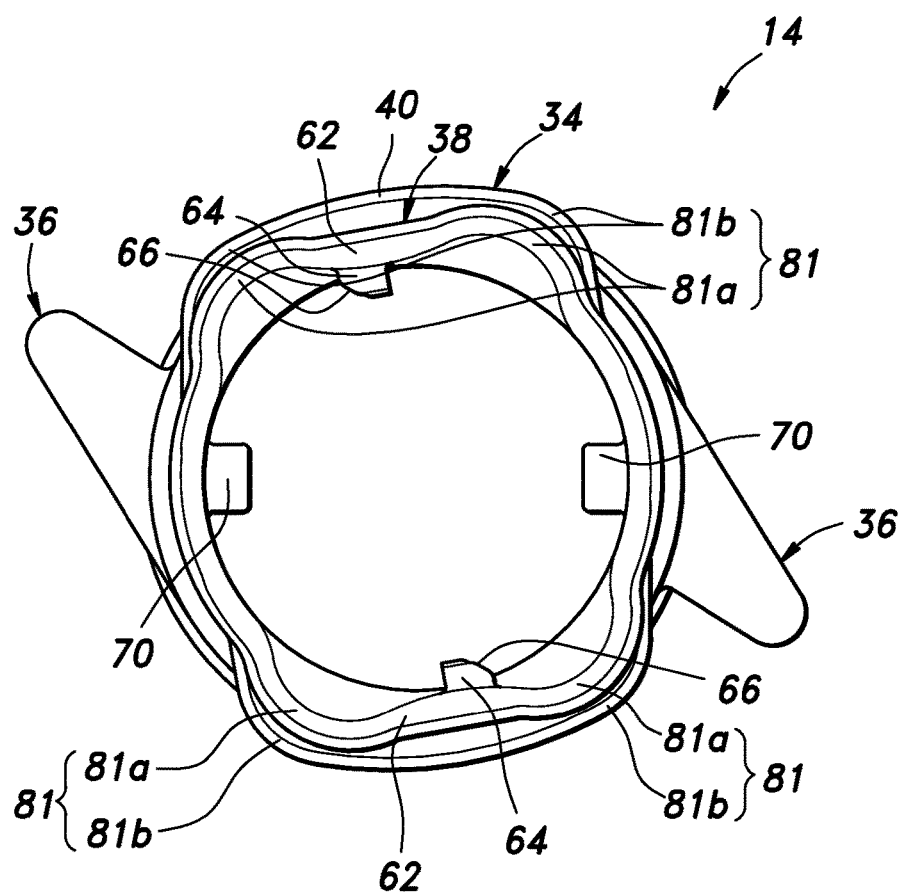
FIG. 7 is a bottom view of the lock member of the hose connector.
Figure 8:
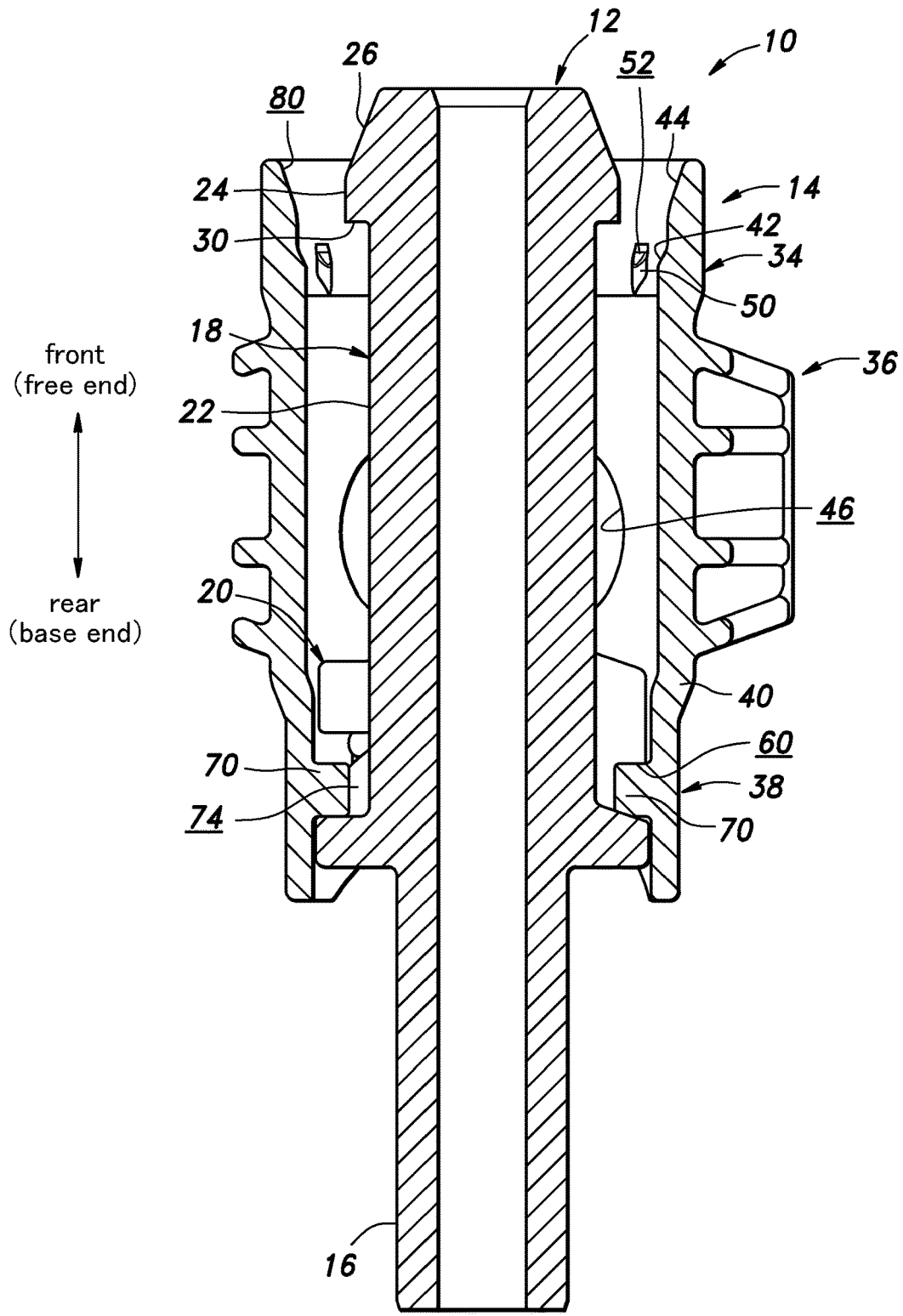
FIG. 8 is a longitudinal sectional view of the hose connector in an unlocked position.
Figure 9:
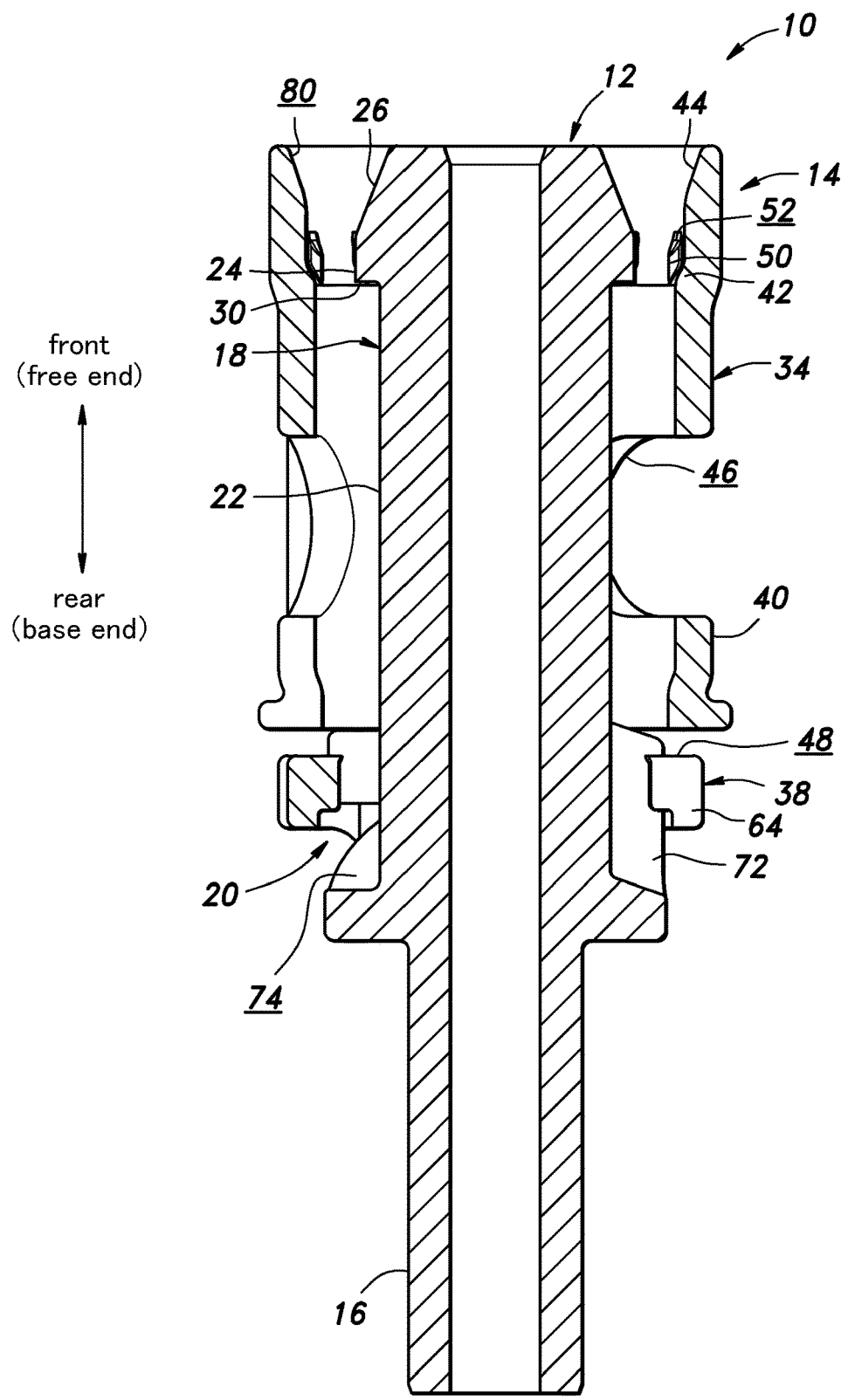
FIG. 9 is a longitudinal sectional view of the hose connector in a locked position.

The lock member 14 is described in the following with reference to FIGS. 5 to 9. FIGS. 5, 6 and 7 are a front view, a right side view and a bottom view of the lock member 14, respectively. FIGS. 8 and 9 are longitudinal sectional views of the hose connector in the unlocked condition where the lock member 14 does not secure the hose and in a locked condition where the lock member secures the hose, respectively. The lock member 14 may be made by molding plastic material such as nylon reinforced with glass fibers, and comprises an outer tubular portion 34 loosely fitted on the inner tubular portion 18 of the connector main body 12 and a pair of operation pieces 36 projecting radially outward from the outer circumferential surface of the outer tubular portion 34.

The inner circumferential surface of the outer tubular portion 34 opposes the outer circumferential surface of the inner tubular portion 18 of the connector main body 12. The outer tubular portion 34 comprises a second engagement portion 38, a perforated portion 40, an annular reduced diameter portion 42 and an internally tapered end portion 44, in that order from the rear end thereof.

The second engagement portion 38 provides a means for engagement between the connector main body 12 and the lock member 14 in cooperation with the first engagement portion 20. Further details of the second engagement portion 38 will be described hereinafter.

The perforated portion 40 consists of a cylindrical wall having an inner circumferential surface substantially opposing the intermediate portion 22 of the connector main body 12 and defining a pair of windows 46 diametrically opposing each other and each elongated in the circumferential direction. Therefore, the intermediate portion 22 of the connector main body 12 is visible from outside via the windows 46. Along the boundary between the second engagement portion 38 and the perforated portion 40, a pair of circumferentially elongated slots 48 are formed at diametrically opposing positions. The circumferential dimension of each slot 48 is greater than that of the windows 46, and the axial dimension of each slot 48 is smaller than that of the windows 46. The wall parts located between the slots 48 along the boundary between the second engagement portion 38 and the perforated portion 40 serve as frangible parts 49 which are configured to preferentially fracture when shear stress is applied to this part. The frangible parts 49 may be formed thinner than the remaining part of the outer tubular portion 34 by using grooves or notches.

The annular reduced diameter portion 42 has an inner circumferential surface that tapers from the front end to the rear end thereof, and the inner diameter at the base end coincides with the inner diameter of the perforated portion 40. The inner circumferential surface of the annular reduced diameter portion 42 is provided with a plurality of restriction projections 50 each elongated in the axial direction and projecting in the radially inward direction. See FIG. 1. Each restriction projection 50 is formed with an axial through hole 52 so that the restriction projections 50 are allowed to deform in a resilient manner, and the inner diameter defined by the tips of the restriction projections 50 can be thereby readily expanded. The front end surface of each restriction projection 50 is slanted rearward. The annular reduced diameter portion 42 is positioned to be to the rear of the annular enlarged diameter portion 24 of the connector main body 12 in the unlocked position, and to be radially opposite to the annular enlarged diameter portion 24 in the locked position.

The internally tapered end portion 44 has an inner circumferential surface that tapers away from the front end, and the inner diameter at the rear end of the internally tapered end portion 44 coincides with the inner diameter of the front end of the annular reduced diameter portion 42, and the inner diameter of the front end of the internally tapered end portion 44 is greater than the outer diameter of the hose.

The two operation pieces 36 project from the outer circumferential surface of the perforated portion 40 at diametrically opposed positions. Each operation piece 36 includes a main wall 54 and four ribs 56 that connect the main wall 54 to the outer circumferential surface of the lock member 14. Each main wall 54 is provided with a planar front surface which extends in parallel with the axial direction and is angled to the outer circumferential surface of the lock member 14 by 70 to 90 degrees. The four ribs 56 are triangular in shape in plan view with one side extending along the back surface of the main wall 54 and another side extending along the outer circumferential surface of the lock member 14.

The engagement structure between the first engagement portion 20 of the connector main body 12 and the second engagement portion 38 of the lock member 14 is described in the following with reference to FIGS. 2 to 7. This engagement structure between the first engagement portion 20 and the second engagement portion 38 provides a retention mechanism for retaining the lock member 14 to the connector main body 12 in the unlocked position (FIG. 8), a cam mechanism for moving the lock member 14 from the unlocked position to the locked position (FIG. 9), and a detent mechanism for holding the lock member 14 in the locked position and creating a tactile sensation to the user when the lock member 14 is moved to the locked position. The first engagement portion 20 in fact consists of two individual identical parts which serve the same purpose, and so is the second engagement portion 38. The first engagement portions 20 and the second engagement portions 38 are arranged in a rotationally symmetric manner so that the same shape is created when these portions are rotated around the axial line by 180 degrees. Thus, there are a pair of sets of combination each including one of the first engagement portions 20 and one of the second engagement portions 38, but only one set of combination may be discussed in this disclosure because these two sets are identical in configuration and functions.

The retention mechanism is formed by a projection 58 formed in the first engagement portion 20, a retention recess 60 formed behind the projection 58, a resilient piece 62 formed in the second engagement portion 38 and an engagement projection 64 projecting radially inward from the resilient piece 62. The projection 58 projects from the outer circumferential surface of the first engagement portion 20. The front surface of the projection 58 slants rearward or recedes rearward as one moves radially outward, and the rear surface of the projection 58 is perpendicular to the axial direction. The front wall surface of the retention recess 60 coincides with the rear surface of the projection 58, and the rear wall surface of the retention recess 60 is perpendicular to the axial direction. One of the lateral sides of the retention recess 60 is open (in the direction away from the paper of FIG. 2). The resilient piece 62 is circumferentially elongated and extends about one quarter of the entire circumferential length of the second engagement portion 38, and forms a beam-like member that is separated from the perforated portion 40 by the slot 48 to provide a high level of resiliency. The two end parts of the beam-like resilient piece 62 bulge radially outward in comparison with the remaining part of the second engagement portion 38 not adjoining the slot 48. Therefore, even when the engagement projection 64 is pressed radially outward, and the resilient piece 62 is resiliently deformed as a result, the resilient piece 62 is prevented from contacting the first engagement portion 20. The front surface of the engagement projection 64 extends perpendicularly to the axial direction. The engagement projection 64 is provided with a rectangular shape with a cut corner in a sectional view perpendicular to the axial line owing to the provision of a cut surface 66 that cuts the corner defined by the radially inwardly facing surface and one of the circumferentially facing surfaces of the engagement projection 64. The circumferentially facing surface associated with the cut surface 66 faces the open side of the retention recess 60 when the engagement projection 64 is received in the retention recess 60. The other circumferentially facing surface is devoid of such a cut surface, and extends perpendicularly to the circumferential direction.

The cam mechanism is formed by a cam groove 68 formed in the first engagement portion 20 and a follower projection 70 formed in the second engagement portion 38 and received in the cam groove 68. The cam groove 68 includes an introduction section 72 extending in the axial direction at a position circumferentially offset from the projection 58 and the retention recess 60 by 90 degrees, an oblique section 74 extending from the rear end of the introduction section 72 obliquely forward (in the same circumferential direction as the open side of the retention recess 60 or leftward in FIG. 2), and a terminal section 76 extending circumferentially (leftward in FIG. 2) from the front end of the oblique section 74. The distance of the bottom surface of the cam groove 68 from the axial center line coincides with the outer diameter of the intermediate portion 22, and is substantially constant over the entire region from the introduction section 72 to the terminal section 76. The front end of the introduction section 72 is open. The follower projection 70 projects radially inward from the inner circumferential surface of the second engagement portion 38, and is circumferential offset from the engagement projection 64 by 90 degrees.

The detent mechanism is formed by a slide surface 78 formed in the first engagement portion 20 along with the resilient piece 62, the engagement projection 64 and the introduction section 72 of the cam groove 68. The slide surface 78 is a plane defined by a chord of the circular general profile of the first engagement portion 20 in cross sectional view, and extends from the open side of the retention recess 60 to the opposing side edge of the introduction section 72 of the cam groove 68. In other words, the slide surface 78 is provided on the circumferentially opposite side of the oblique section 74 with respect to the introduction section 72.

The mode of operation of the retention mechanism, the cam mechanism and the detent mechanism is described in the following. First of all, with the follower projection 70 aligned with the introduction section 72 of the cam groove 69, and the engagement projection 64 aligned with the projection 58 and the retention recess 60 in the axial direction, the lock member 14 is fitted on the connector main body 12 from the front end side thereof. The follower projection 70 therefore moves along the introduction section 72. Meanwhile, the engagement projection 64 slides over the slanted front surface of the projection 58, and causes the resilient piece 62 to resiliently deform in the radially outward direction. The engagement projection 64 then regains the original shape once the engagement projection 64 reaches the retention recess 60. Thus, the engagement projection 64 snap engages with the retention recess 60. At this time, because the rear surface of the projection 58 abuts the front surface of the engagement projection 64 in this engaged condition, the forward movement of the lock member 14 is prevented. Also, the rearward movement of the lock member 14 is prevented by the rear surface of the projection 58 engaging the rear wall surface of the retention recess 60. When the lock member 14 is turned in clockwise direction in plan view (counterclockwise direction in the bottom view of FIG. 7) from this condition (unlocked condition), the follower projection 70 moves in the circumferential and forward direction along the oblique section 74 until reaching the terminal section 76. Meanwhile, the engagement projection 64 is dislodged from the retention recess 60, and is received in the introduction section 72 as the cut surface 66 slides over the slide surface 78. Once the engagement projection 64 is received in the introduction section 72, because the circumferentially facing surface of the engagement projection 64 facing away from the cut surface 66 is engaged in the introduction section 72, the reverse rotation of the lock member 14 is prevented. Because the resilient piece 62 is required to resiliently deform in the radially outward direction when the engagement projection 64 is dislodged from the retention recess 60 and when the engagement projection 64 is about to be received by the introduction section 72, the user is required to exert an increased twisting force to the lock member 14 to keep turning the lock member 14. Furthermore, when the engagement projection 64 is received by the introduction section 72, the resilient piece 62 regains the original shape thereof so that the resilient piece 62 collides with the first engagement portion 20 (the part thereof defining an edge of the introduction section 72), thereby creating an impact sound. As a result, the user is notified of the positioning of the lock member 14 to the locked position via both the tactile sense and the auditory sense.

The procedure for connecting a hose by using this hose connector 10 is described in the following with reference to FIGS. 8 and 9.

The user initially fits the lock member 14 on the connector main body 12, and places the lock member 14 in the unlocked position as shown in FIG. 8. More specifically, the lock member 14 is fitted on the connector main body 12 in the following way. The lock member 14 is positioned with respect to the connector main body 12 such that the follower projection 70 and the engagement projection 64 align with the introduction section 72 and the retention recess 60 in the axial direction, respectively, and the lock member 14 is fitted onto the connector main body 12 from the free end thereof and is slid toward the base end of the connector main body 12 until the engagement projection 64 is received in the retention recess 60. The connection of the base end of the connector main body 12 to a hose or another device may be performed either before or after this stage. Because the lock member 14 is in the unlocked position, the engagement projection 64 is engaged by the wall surface of the retention recess 60, the lock member 14 is prevented from moving in the fore and aft direction or rotating in counterclockwise direction in plan view, and is also prevented from rotating in clockwise direction in plan view unless a twisting force exceeding a prescribed value is applied to the lock member 14.

The user then pushes the front end of a hose into an annular gap defined between the inner tubular portion 18 of the connector main body 12 and the outer tubular portion 34 of the lock member 14. At this time, owing to the externally tapered end portion 26 formed on the free end of the connector main body 12 and the internally tapered end portion 44 formed on the front end of the lock member 14, the entrance to the annular gap 80 diverges toward the free end so that the insertion of the hose into the annular gap 80 is facilitated. Because the annular enlarged diameter portion 24 of the connector main body 12 and the annular reduced diameter portion 42 of the lock member 14 are not aligned with each other, the radial distance between the inner tubular portion 18 and the outer tubular portion 34 is greater than the wall thickness of the hose. Therefore, the user is able to insert the hose into the annular gap 80 without any difficulty. Furthermore, because the front end side of each restriction projection 50 is sloped, and the tip thereof facing radially inward can readily deform in a resilient manner in a radially outward direction, the restriction projections 50 do not obstruct the insertion of the hose. Also, because the externally tapered end portion 26 and the intermediate portion 22 are formed with the ribs 28 and 32, the contact area between these parts and the inner circumferential surface of the hose is minimized so that the frictional resistance when inserting the hose into the annular gap 80 is reduced. Owing to this arrangement, although the annular enlarged diameter portion 24 applies a frictional force to the inner circumferential surface of the hose, the user is still enabled to insert the hose into the annular gap 80 without requiring any undue effort. The user is enabled to visually ascertain that the front end of the hose is inserted into the annular gap 80 beyond the annular enlarged diameter portion 24, and abuts the shoulder surface 29 via the windows 46.

Thereafter, the user turns the lock member 14 in clockwise direction in plan view until the lock member 14 rotates to the locked position as shown in FIG. 9. In FIG. 9, the hose is omitted from the illustration. As the user turns the lock member 14 from the unlocked position in clockwise direction in plan view, the follower projection 70 moves along the oblique section 74 of the cam groove 68, and the lock member 14 moves forward as a result. Once the follower projection 70 reaches the terminal section 76, and the engagement projection 64 is engaged by the introduction section 72, the lock member 14 is held in the locked position. At this time, the annular enlarged diameter portion 24 and the annular reduced diameter portion 42 radially oppose each other so that the radial distance between these portions is smaller than the wall thickness of the hose. As a result, the hose is clamped between these two portions such that the hose is held in position and is connected to the connector main body 12 in a fluid tight manner. Also, because the distance between the annular enlarged diameter portion 24 and the restriction projections 50 is smaller than the wall thickness of the hose, the restriction projections 50 push the wall of the hose against the annular enlarged diameter portion 24 so that the hose is fixedly secured to the connector main body 12 in a highly secure manner.

In the locked position, the lock member 14 can be turned within a range where the engagement projection 64 and the follower projection 70 are received in the introduction section 72 and the terminal section 76, respectively. However, because the terminal section 76 is not slanted, the lock member 14 cannot be moved in the fore and aft direction. The reverse rotation of the lock member 14 is prevented by the engagement between the engagement projection 64 and one of the side walls of the introduction section 72, but can be turned with an excessive twisting force which is enough to destroy the lock member 14. When it is attempted to turn the lock member 14 in the normal direction from the locked position, the lock member 14 is prevented from turning by the engagement between the engagement projection 64 and the other side wall of the introduction section 72 and/or the engagement between the follower projection 70 and the one of the side walls of the terminal section 76, but again can be turned with an excessive twisting force which is enough to destroy the lock member 14. More specifically, owing to the presence of the slots 48 between the second engagement portion 38 and the perforated portion 40 provided with the operation pieces 36, when a twisting force is applied to the operation pieces 36 while the second engagement portion 38 is fixedly engaged by the first engagement portion of the connector main body 12, a circumferential shear stress is produced in the frangible parts 45 located between the slots 48, and eventually fractures the frangible parts 45. Once this fracture takes place, as the fracture is visually discernible, and the part of the lock member 14 more forward than the perforated portion 40 can still be turned, the user can see that the lock member 14 is fractured. Meanwhile, the second engagement portion 38 maintains the engaged state, and prevents the part of the lock member 14 more forward than the perforated portion 40 from moving rearward by supporting the perforated portion 40 from the rear via the fractured surface so that the part of the lock member 14 more forward than the perforated portion 40 is rotatable with the hose or rotatable with respect to the hose, but is prevented from moving rearward. Therefore, the fixed state and the sealed state of the hose can be maintained. Alternatively, the lock member 14 may be configured to fracture along an oblique line extending between an end of each slot 48 to the corresponding window 46. In this case also, because the second engagement portion 38 which is fixedly secured supports the annular reduced diameter portion 42 from moving rearward via the fractured part and the non-fractured part, the fixed state and the sealed state of the hose can be maintained.

As shown in FIG. 7, curved portions 81 bulging radially outward are formed on parts of the lock member 14 located on either end of each slot 48, and the gap between the lock member 14 and the connector main body 12 is hence enlarged in these parts. Each curved portion 81 extends axially from the rear end of the lock member, and includes a first part 81a extending over the entire fore and aft length of the second engagement portion 38 and a second part 81b extending in a rear end part of the perforated portion. In other words, each curved portion 81 extends from the rear end of the lock member 14 to a part located ahead of the frangible part 49. When the lock member 14 is desired to be removed after the lock member 14 has been fractured, it can be accomplished by making an axial cut in the lock member 14 by inserting a tool such as a wire nipper under the curved portion 81. In this case, the hose or the connector main body 12 is prevented from damages because the curved portion 81 defines a gap for safely inserting the tool therein. Therefore, the hose and the connector main body 12 are not required to be discarded, and can be used once again.

A first modified embodiment of the hose connector 10 is described in the following with reference to FIGS. 10 to 12. In the description of the first modified embodiment, the parts corresponding to those of the preceding embodiment are denoted with like numerals.

Figure 10A:
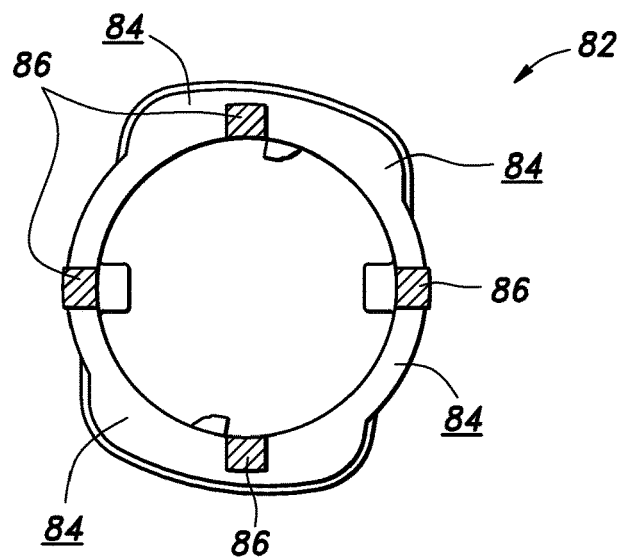
FIG. 10a is a cross sectional view of a lock member of a hose connector given as a first modification of the present invention.
Figure 10B:
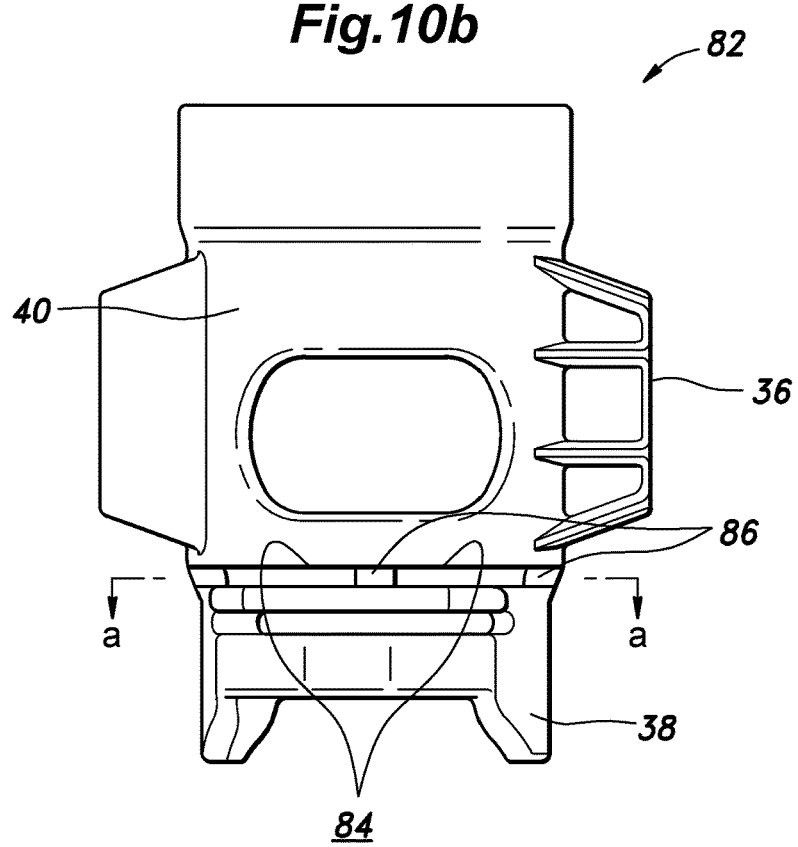
FIG. 10b is a front view of the lock member of the hose connector of the first modification.

FIG. 10a is a cross sectional view of the lock member 82 of the first modified embodiment, and FIG. 10b is a front view of the lock member 82. This lock member 82 differs from the lock member 14 of the primary embodiment in that the part thereof more rearward than the windows 46 of the perforated portion 40 is formed with four circumferential slots 84 passed through the perforated portion 40 and four pillars 86 which are separated from one another by the circumferential slots 84. Each slot 84 extends over an angular range of 80 to 89 degrees so that the circumferential dimension of the pillars 86 is small. Therefore, when a twisting force is applied to the lock member 82 in the locked position, the resulting circumferential shear stress is concentrated in the pillars 86 so that the lock member 82 is fractured preferentially in the pillars 86. When the lock member 82 is fractured, the part of the lock member 82 ahead of the slots 84 and the pillars 86 becomes free rotatable similarly as in the previous embodiment so that the user can readily detect the fracture of the lock member 82. At this time, the second engagement portion 38 maintains the engaged condition so that the part of the lock member 82 ahead of the slots 84 and the pillars 86 is prevented from moving rearward. Therefore, the fixed state and the sealed state of the hose can be maintained.

Figure 11:
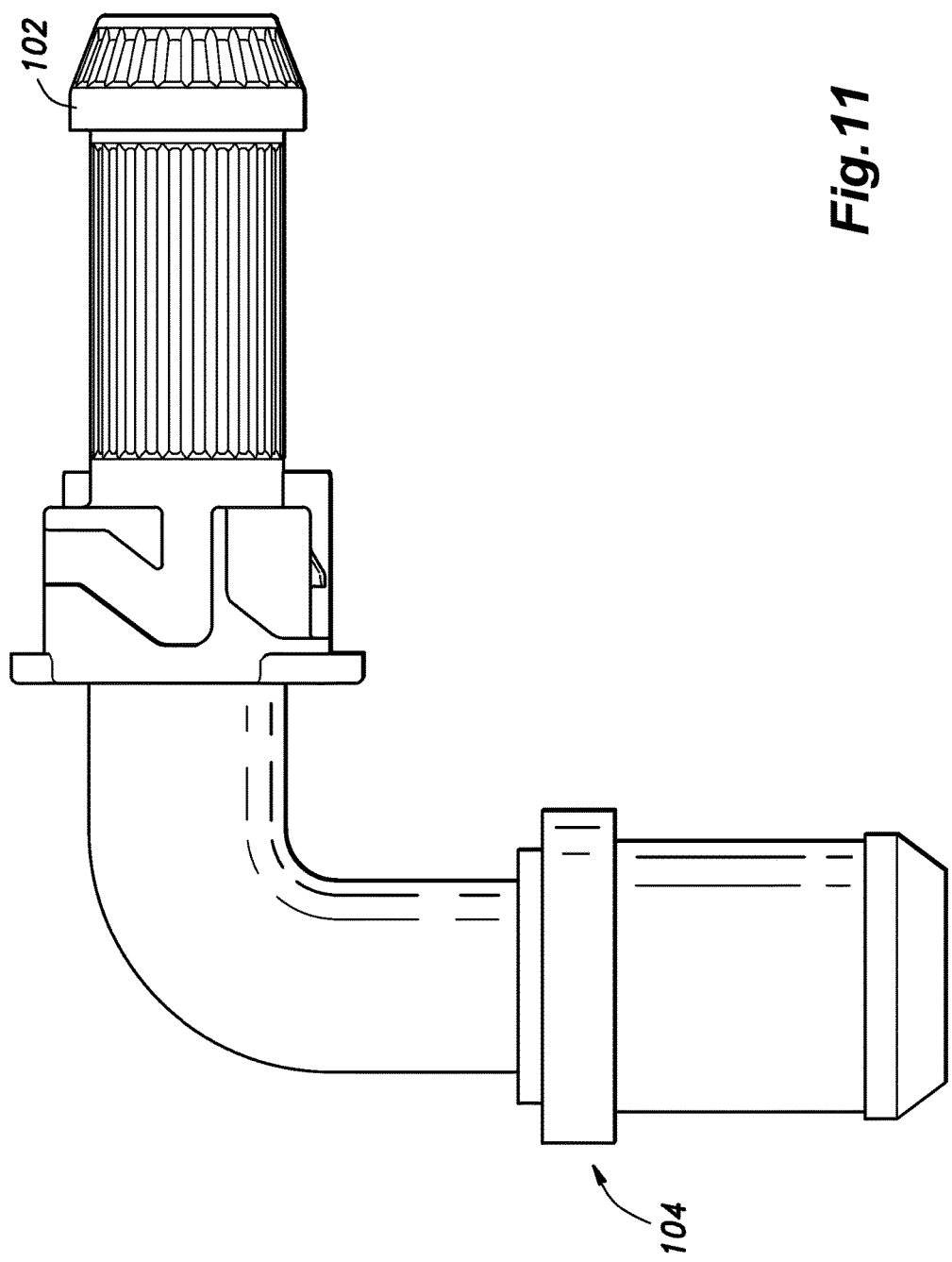
FIG. 11 is a PCV valve which is integrally formed with a connector main body of a hose connector given as a second modification of the present invention.

FIG. 11 shows the connector main body 102 of the second modified embodiment. The connector main body 12 of the primary embodiment was molded as a separate component from the other member that is to be connected, and was connected to the other member. In the second modified embodiment, the connector main body 102 is integrally formed with the other member which may consist of an automotive component such as a PCV valve device 104.

Figure 12:
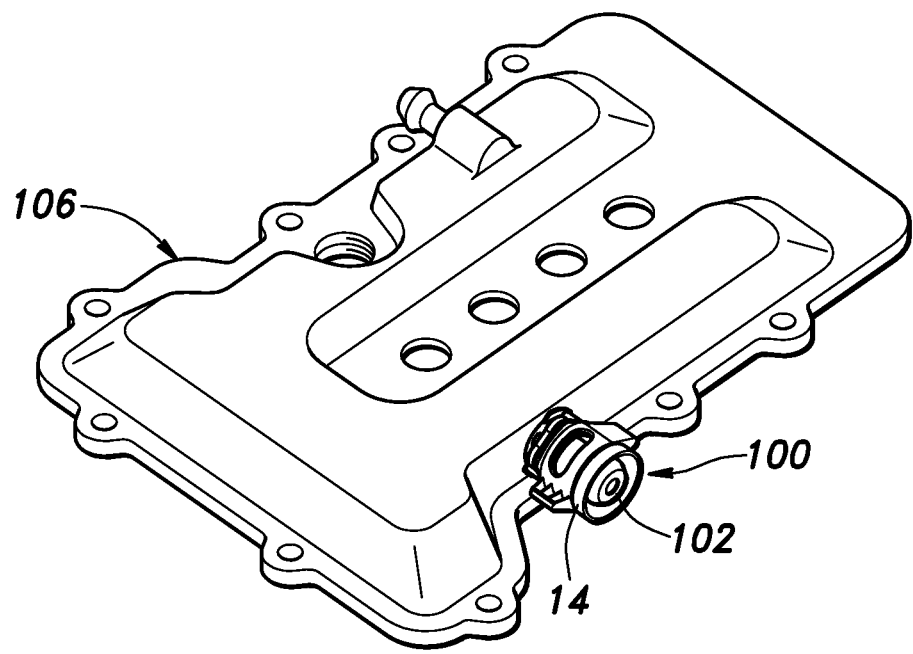
FIG. 12 is a perspective view of a head cover which is integrally formed with the connector main body of the hose connector of the second modification.

FIG. 12 shows another aspect of the hose connector 100 of the second modified embodiment. The connector main body 102 shown in FIG. 12 is integrally formed with the other member which may consist of an automotive component such as a cylinder head cover 106. The lock member 14 is fitted on this connector main body 102, and an annular gap for inserting a hose is defined between these two parts. The connector main body 102 may be connected to any other automotive component part having a fluid passage to be communicated with the connector main body 102 such as a blow-by gas hose joint and a blow-by gas heater, instead of the PCV valve device 104 or the cylinder head cover 106.

The present invention was described in terms of specific embodiments, but the present invention is not limited by the illustrated embodiments, and can be changed in various parts thereof without departing from the spirit of the present invention. For instance, the fluid passage of the hose connector may be bifurcated such that the hose connector is provided with two or more free ends. It is also possible to arrange such that the base end of the hose connector is provide with a similar arrangement as the free end thereof so that two hoses may be connected to each other via the hose connector. According to yet another variation, a part or all of the lock member may be made of transparent or semi-transparent material so that such a part may serve as the window. According to yet another variation, the annular reduced diameter portion and the annular enlarged diameter portion are positioned such that the annular reduced diameter portion is positioned more forward than the annular enlarged diameter portion in the unlocked position, and the transition from the unlocked position to the locked position may be accomplished by the rearward movement of the lock member. The annular reduced diameter portion and the annular enlarged diameter portion may be configured such that these two portions oppose each other with axially facing slanted surfaces. Alternatively, one of the portions or both of the portions may be defined by annular projections. Lastly, the curved portion may be provided on the front end side of the lock member.

Glossary

| 10, 100 | hose connector | 12, 102 | connector main body |
|---|---|---|---|
| 14 | lock member | 20 | first engagement portion |
| 24 | annular enlarged diameter portion | 26 | externally tapered end portion |
| 36 | operation piece | 38 | second engagement portion |
| 42 | annular reduced diameter portion | 44 | internally tapered end portion |
| 46 | window | 58 | projection |
| 60 | retention recess | 62 | resilient piece |
| 64 | engagement projection | 68 | cam groove |
| 70 | follower projection | 80 | annular gap |

The invention claimed is:

1. A hose connector for connecting a hose, comprising;
a connector main body including an inner tubular portion and a first engagement portion formed on an outer circumference of a base end part of the inner tubular portion; and
a lock member including an outer tubular portion fitted on the inner tubular portion and having an inner circumferential surface defining an annular gap in cooperation with an outer circumferential surface of the inner tubular portion, and a second engagement portion formed on the outer tubular portion for selective engagement with the first engagement portion;
wherein the lock member is rotatable relative to the connector main body around an axial line in a prescribed direction so as to displace the lock member from an unlocked position to a locked position in an axial direction, an engagement structure formed jointly by the first engagement portion and the second engagement portion engaging the two engagement portions with each other in the locked position so as to prevent the rotation of the lock member back to the unlocked position;
wherein the inner tubular portion is provided with an annular enlarged diameter portion on an outer circumferential surface thereof, and the outer tubular portion is provided with an annular reduced diameter portion on an inner circumferential surface thereof, the annular enlarged diameter portion and the annular reduced diameter portion being positioned such that the annular enlarged diameter portion and the annular reduced diameter portion are axially spaced from each other when the lock member is in the unlocked position, and axially proximate to each other when the lock member is in the locked position;
wherein a front end of a hose can be inserted in the annular gap between the inner tubular portion and the outer tubular portion when the lock member is in the unlocked position, and the front end of the hose can be clamped between the annular enlarged diameter portion and the annular reduced diameter portion when the lock member is displaced to the locked position; and
wherein the lock member is provided with a frangible part that is preferentially fractured before the engagement structure between the first engagement portion and the second engagement portion is broken, or the annular enlarged diameter portion or the annular reduced diameter portion is fractured when a twisting force exceeding a prescribed level is applied to the lock member in the locked position, the frangible part being positioned so as to prevent or restrain the annular enlarged diameter portion and the annular reduced diameter portion from separating from each other when fractured.

2. The hose connector according to claim 1, wherein the frangible part is formed in a part of the lock member that axially separates the annular reduced diameter portion and the second engagement portion from each other.

3. The hose connector according to claim 2, wherein the lock member is provided with an operation piece projecting outward from an outer circumferential surface of the outer tubular portion, and the frangible part is provided axially between the operation piece and the second engagement portion.

4. The hose connector according to claim 2, wherein a plurality of circumferentially elongated slots are formed in the lock member between the annular reduced diameter portion and the second engagement portion, and the frangible part consists of a pillar separating each adjoining pair of slots.

5. The hose connector according to claim 4, wherein the slots are formed adjacent to the second engagement portion such that a peripheral wall of the outer tubular portion surrounding the second engagement portion is given with a high level of resiliency.

6. The hose connector according to claim 1, wherein the connector main body and the lock member are provided with a cam mechanism for displacing the lock member from the unlocked position to the locked position when the lock member is turned relative to the connector main body in the prescribed direction around the axial line, the cam mechanism including a cam groove formed in one of the connector main body and the lock member and extending obliquely in a circumferential and axial direction, and a follower projection formed in the other of the connector main body and the lock member and received in the cam groove.

7. The hose connector according to claim 1, wherein the lock member is provided with a curved portion that bulges outward and extends axially so as to space apart the outer circumferential surface of the connector main body and the inner circumferential surface of the lock member at least on one side of an end portion of the lock member.

8. An automotive component part integrally provided with the hose connector according to claim 1, and defining a fluid passage communicating with the connector main body.

* * * * *